United States Patent [19]

Shuey

[11] Patent Number: 4,645,956
[45] Date of Patent: Feb. 24, 1987

[54] CURRENT LIMITER FOR POWER LINE COMMUNICATION AMPLIFIER

[75] Inventor: Kenneth C. Shuey, Raleigh, N.C.

[73] Assignee: Westinghouse Electric Corp., Pittsburgh, Pa.

[21] Appl. No.: 649,461

[22] Filed: Sep. 11, 1984

[51] Int. Cl.⁴ .................. H03K 17/60; H03K 3/26
[52] U.S. Cl. ................................ 307/562; 307/270; 307/297; 328/172; 328/175; 323/313
[58] Field of Search ............... 307/270, 491, 362, 297, 307/546, 549, 557, 562, 200 A; 323/313, 316, 317; 328/172–175

[56] References Cited

U.S. PATENT DOCUMENTS

| | | | |
|---|---|---|---|
| 3,197,711 | 7/1965 | Richardson | 328/175 |
| 3,629,622 | 12/1971 | Denenberg, Jr. | 307/297 |
| 3,911,415 | 10/1975 | Whyte | 340/310 A |
| 3,924,223 | 12/1975 | Whyte et al. | 340/310 R |
| 3,942,168 | 3/1976 | Whyte | 340/310 R |
| 3,942,170 | 3/1976 | Whyte | 340/310 A |
| 3,962,547 | 6/1976 | Pattantyus | 179/2.51 |
| 3,967,264 | 6/1976 | Whyte et al. | 340/310 A |
| 4,004,110 | 1/1977 | Whyte | 179/170 J |
| 4,008,467 | 2/1977 | Pattantyus et al. | 340/310 A |
| 4,210,901 | 7/1980 | Whyte et al. | 340/310 R |
| 4,306,161 | 12/1981 | Sheinberg | 307/255 |
| 4,311,964 | 1/1982 | Boykin | 329/104 |
| 4,355,303 | 10/1982 | Phillips et al. | 340/310 A |
| 4,357,598 | 11/1982 | Melvin | 340/310 A |
| 4,379,284 | 4/1983 | Boykin | 340/310 R |
| 4,533,839 | 8/1985 | Balakrishnan | 307/270 |

Primary Examiner—Stanley D. Miller
Assistant Examiner—Richard Roseen
Attorney, Agent, or Firm—B. R. Studebaker

[57] ABSTRACT

A current limiter is provided which responds to the magnitude of the output current signal from a power amplifier. A full wave rectified signal is provided in response to the magnitude of the current output signal and is used as an input to a comparator. The other input of the comparator is a voltage reference signal that represents a maximum desired current level for the output current signal of the power amplifier. When the output current signal exceeds its reference level, a signal is provided which is used as an input to an exclusive-OR gate which has, as its other input, a modulated square wave signal. The effect of the exclusive-OR gate is to notch the square wave modulated signal in such a way so as to alter its shape. The altered square wave carrier signal causes the MOSFETs of the power amplifier to switch on and switch off at additional occurrences which has the effect of reducing the maximum current level of the output current signal being output by the power amplifier.

11 Claims, 11 Drawing Figures

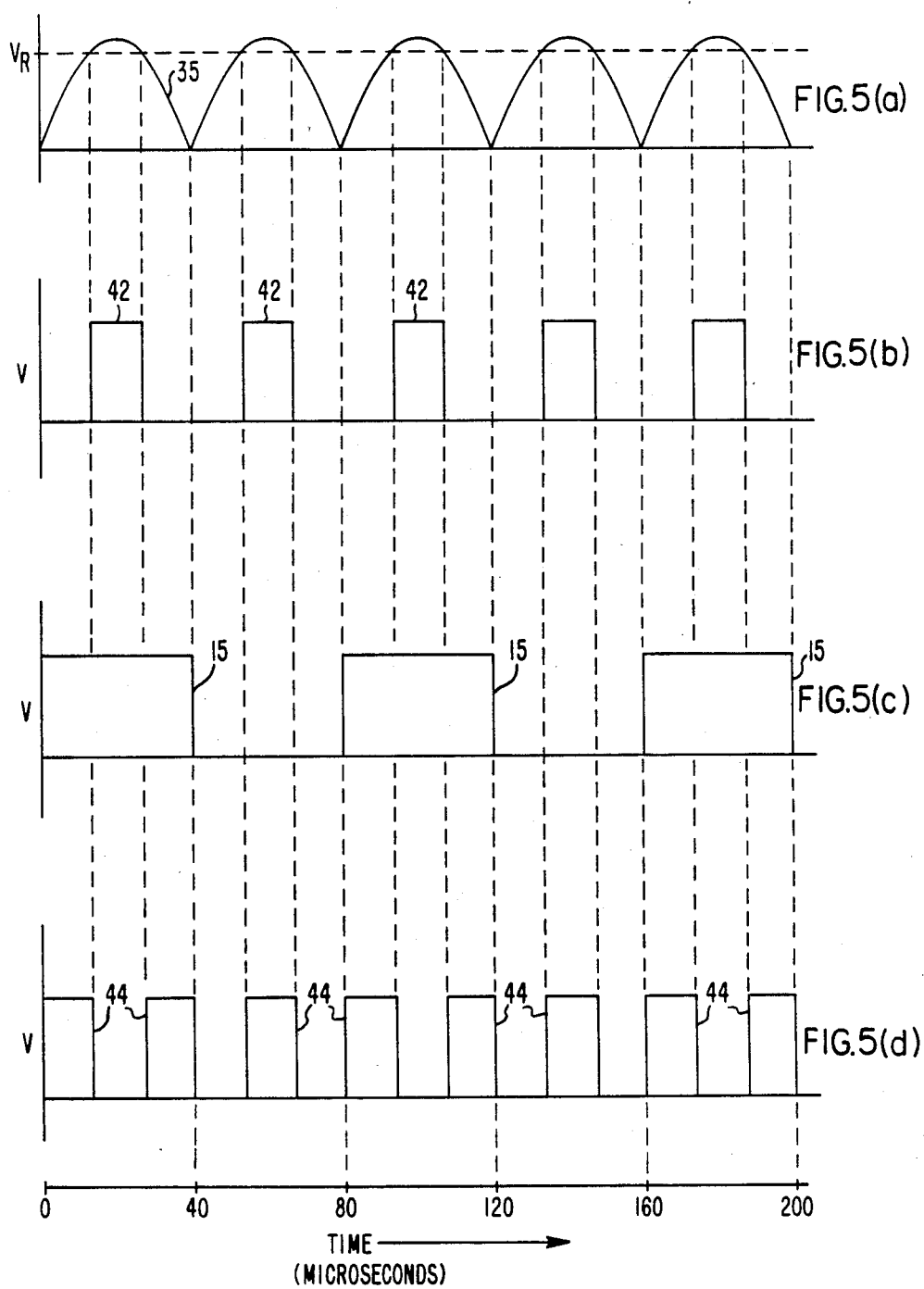

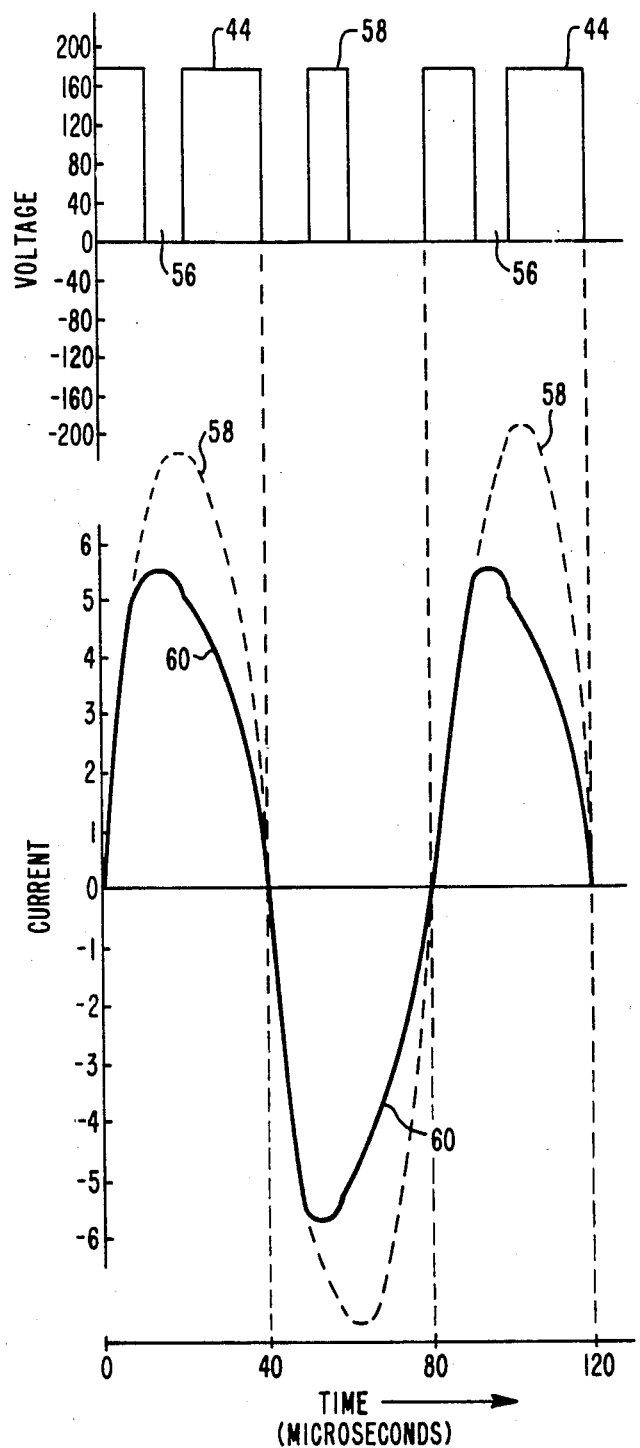

CURRENT LIMITER FOR POWER LINE COMMUNICATION AMPLIFIER

BACKGROUND AND SUMMARY OF THE INVENTION

The present invention relates generally to power amplifiers for use in power line communication systems and, more particularly, to a current limiter for use in power line communication systems that utilize phase shift keyed modulation.

Many different types of power line communication systems are known to those skilled in the art. These types of systems can be used by electric utility companies to transmit messages to remote terminals which are located at electrical consumers' residences. A coded signal is imposed on the power line by injecting it onto the 60 Hz current flowing through the power line. Remote receivers are adapted to filter the 60 Hz waveforms from the signal and demodulate the carrier signal which is generally a much higher frequency, such as 12.5 kilohertz.

It has been found that phase shift keyed (PSK) signals are well suited for power line communications systems. U.S. Pat. No. 3,911,415 which issued on Oct. 7, 1975 to Whyte discloses a distribution network power line carrier communication system and U.S. Pat. No. 3,924,223 which issued on Dec. 2, 1975 to Whyte et al. discusses a power line communication system having a protective terminating impedance arrangement. Also, U.S. Pat. Nos. 3,942,168 and 3,942,170 which issued to Whyte on Mar. 2, 1976 both disclose distribution network power line communication systems.

In applications of power line communication systems in which a transmitted message is intended to travel a considerable distance on the power line, repeaters are used for the purpose of receiving the transmitted signal and retransmitting that signal to remote receivers. U.S. Pat. No. 3,962,547 which issued on June 8, 1976 to Pattantyus discloses a repeater coupler for power line communication systems. A signal repeater for a distribution network communication system is disclosed in U.S. Pat. No. 4,210,901 which issued on July 1, 1980 to Whyte et al. When a single electric utility central communication unit is used to communicate with a large number of remote receivers, the remote receivers can be assigned addresses which permit them to distinguish messages intended for their use. U.S. Pat. No. 3,967,264 which issued on June 29, 1976 to Whyte et al. discloses a distribution network power line communication system that includes addressable interrogation and response and U.S. Pat. No. 4,250,489 which issued on Feb. 10, 1981 to Dudash et al. discloses a distribution network communication system having branch connected repeaters.

U.S. Pat. No. 4,004,110 which issued on Jan. 18, 1977 to Whyte discloses a power supply for power line carrier communication systems and U.S. Pat. No. 4,008,467 which issued on Feb. 15, 1977 to Pattantyus et al. discloses a power line carrier communication system which has an efficient carrier signal coupling apparatus.

In a phase shift keyed (PSK) carrier communication system, a base band data signal is used to modulate a higher frequency carrier signal. In a typical application of a communication system of this type, the carrier signal has a frequency of approximately 12.5 kilohertz and the base band data message is approximately 76 baud, although many other frequencies and data rates can be used. These two signals are modulated together by connecting them as inputs to an exclusive-OR gate. The result is a phase shift keyed (PSK) modulation system in which the carrier signal experiences a phase shift upon the occurrence of a leading or lagging edge of the base band signal. In this way, a receiver can demodulate the transmitted signal and decode its message. U.S. Pat. No. 4,311,964 which issued on Jan. 19, 1982 to Boykin discloses a coherent phase shift keyed (PSK) demodulator for a power line communication system. U.S. Pat. No. 4,379,284 which issued on Apr. 5, 1983 to Boykin discloses an improved coherent phase shift keyed (PSK) demodulator for power line communication systems. A coherent phase shift keyed demodulator is disclosed in U.S. Pat. No. 4,514,697 which issued on Apr. 30, 1985 to York. An improved coherent phase shift keyed demodulator is disclosed in U.S. Pat. No. 4,516,079 which issued on May 7, 1985 to York.

A receiver for a distribution network power line communication system is disclosed in U.S. Pat. No. 4,355,303 which issued on Oct. 19, 1982 to Phillips et al. and U.S. Pat. No. 4,357,598 which issued on Nov. 2, 1982 to Melvin discloses a three-phase power distribution network communication system. Some repeaters and load management terminals can utilize transceivers which are capable of both transmitting and receiving power line communication signals. Such a transceiver is disclosed in U.S. patent application Ser. No. 575,125 which was filed on Jan. 30, 1984 by Shuey and assigned to the assignee of the present application.

After a coded message modulates the carrier signal, the resulting PSK square wave signal is amplified and injected onto the power line as a sinusoidal current waveform. This square wave signal can be amplified by use of a switching type transmitter. Known amplifiers utilize metal-oxide semiconductor field-effect transistors (MOSFET) for switching. The MOSFETs are devices that consist of diffused source and drain regions on either side of a p or n channel region, and a gate electrode insulated from the channel by silicon oxide. When a control voltage is applied to the gate, the channel is converted to the same type of semiconductor as the source and drain. This eliminates part of the pn junction and permits current to be established between the source and the drain. Functionally, the main difference between a MOSFET and a bipolar transistor is that the source and drain of the MOSFET are interchangeable, unlike the emitter and collector of the bipolar transistor. This type of amplifier circuit responds to changes in a voltage signal and its output is an amplified current signal which is synchronized with the frequency and phase of its input.

In a power amplifier used in conjunction with a power line communication system, the input voltage signal is a modulated carrier signal and the output current signal is injected onto the power line for transmission to remote receivers. The magnitude of the amplifier's current output signal is a function of the condition and characteristics of the power line itself. Under certain disadvantageous power line conditions, the output current signal can fluctuate widely in magnitude with potentially destructive results. Therefore, some current limiting means must be used to protect the components of the amplifier.

One possible solution to this potential problem is to provide the amplifier with its own known output burden. However, this current limiting technique is inefficient because it utilizes components that dissipate significant power and these components also increase the cost of the amplifier itself. Therefore, a simplified current limiting technique is beneficial for use with power line communication system amplifiers.

The present invention provides a means for altering the voltage input to the power amplifier in such a way so as to reduce its output current signal. The current limiter of the present invention responds to the current magnitude of the power amplifier's output current signal and, when this output current signal exceeds a preselected threshold level, a modulated carrier signal, which is the input to the power amplifier, is altered in such a way so as to reduce the tendency of the power amplifier to output current signals that exceed the threshold on subsequent transmissions.

The present invention is coupled to an output line of the power amplifier by a saturable core current transformer. The secondary current of this current transformer is passed through a full wave rectifier and the rectified signal is compared with a reference signal provided by a resistive voltage divider. These two signals are compared by a comparator and, if the rectified current signal exceeds the reference signal, a logically high signal is sent to an exclusive-OR gate which has, as its other input, the modulated carrier wave signal intended for amplification and transmission. The exclusive-OR gate combines the modulated carrier signal, which contains the coded message to be output, with the signal from the present invention which represents a logically high signal when the current threshold has been exceeded. Therefore, the present invention has the result of removing segments from the logically high portions of the modulated carrier signal and also inserting segments onto the logically low portions of the modulated carrier signal when the output current signal of the power amplifier exceeds the preselected current threshold.

Therefore, the modulated carrier signal which is input to the power amplifier is altered in such a way so as to distort the resulting current signal output and reduce its maximum current levels. Although the present invention has the effect of slightly distorting the shape of the current output signal of the power amplifier during current limiting, its fundamental phase characteristics remain unchanged. Therefore, the present invention provides a current limiter that protects the components of the power amplifier, but does not alter the coded message that is injected onto the power line system.

BRIEF DESCRIPTION OF THE DRAWINGS

The present invention will be more fully understood by reading the description of the preferred embodiment in conjunction with the drawing, in which:

FIG. 5(a) illustrates the rectified current output signal of the power amplifier of FIG. 4;

FIG. 5(b) illustrates the output from the comparator of the present invention;

FIG. 5(c) illustrates the unaltered carrier signal from the microprocessor of FIG. 3 and FIG. 4;

FIG. 5(d) illustrates the altered voltage input signal to the power amplifier of FIG. 4; and FIGS. 6(a) and 6(b) illustrate and altered square wave carrier signal and its resulting distorted current output signal, respectively.

DESCRIPTION OF THE PREFERRED EMBODIMENT

Figure 1:
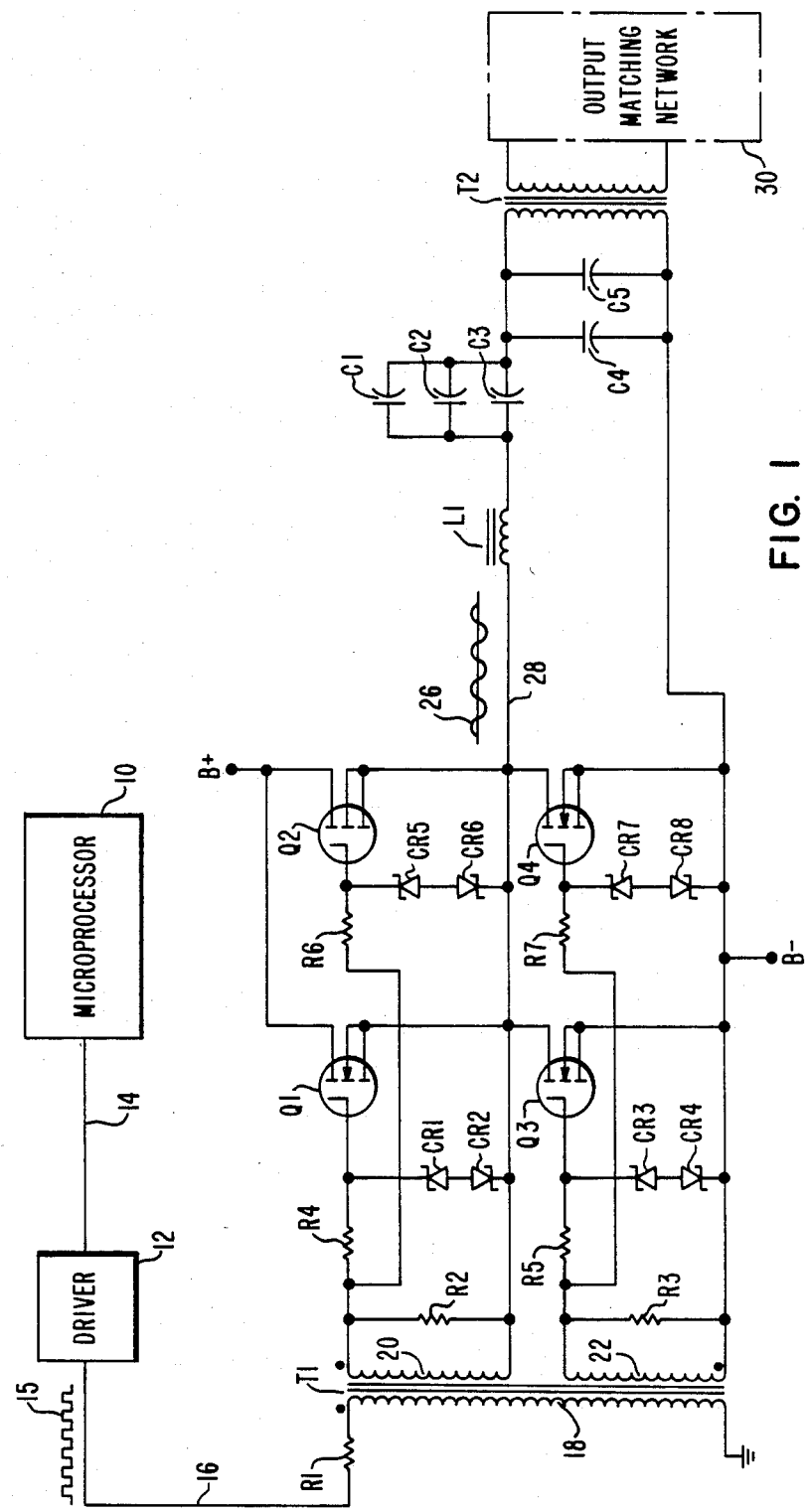
FIG. 1 is a schematic illustration of a power amplifier which is suitable for use with the present invention.

Throughout the description of the preferred embodiment, like reference numerals will be used to designate like components. FIG. 1 schematically illustrates a power amplifier with which the present invention is suitable for use.

In a typical application of a power amplifier for use in a power line communication system, a microprocessor 10 formulates and codes a message for output, on a power line, to remote receivers. Many different types of coding methods are known to those skilled in the art and these methods vary significantly from one another. However, the particular method of encoding an output message is not directly related to the present invention. After encoding the message, the microprocessor and its related logic modulate the higher frequency carrier signal with a base band signal that comprises the coded message. For example, a carrier signal of 12.5 KHz could be modulated with a base band signal of 76 baud. This modulation can be accomplished by connecting the carrier signal (e.g. 12.5 kilohertz square wave) and the baseband data signal (e.g. 76 baud) to the two inputs of an exclusive-OR gate. Its output would be a phase shift keyed (PSK) modulated signal. The resulting square wave modulated carrier signal is sent, on line 14, to a driver 12 which amplifies the logic level signals received on line 14 and sends the amplified voltage signal, on line 16, to the power amplifier.

The modulated carrier signal is received, from line 16, by transformer T1 as illustrated. Resistor R1 is a current limiting resistor that is used in the preferred embodiment of the present invention to set the maximum current of transformer T1.

The carrier signal received by the primary winding 18 of transformer T1 is received by the two portions of the power amplifier, as shown, with the positive square wave pulses being received by one portion and the negative going pulses being received by the other portion due to the polarized nature of the two secondary windings, 20 and 22, of transformer T1. The switching waveforms at the gates of MOSFETs Q1-Q4 are set such that when the gates of MOSFETs Q1 and Q2 are positive, the gates of MOSFETs Q3 and Q4 are negative. These characteristics are incorporated in the preferred embodiment of the present invention to keep the switching times short and assure their off states. Since these two portions of the power amplifier circuit are functionally identical to each other, only the portion connected to secondary winding 20 will be described in detail. It should be understood that, due to the electrical circuitry of the power amplifier, MOSFETs Q1 and Q2 will be switched on when MOSFETs Q3 and Q4 are switched off and vice versa. Resistor R4 is utilized in the preferred embodiment of the present invention to limit inrush current to the gate of MOSFET Q1 and resistor R6 is used to limit inrush current to the gate of MOSFET Q2. Resistors R2 and R3 are utilized as discharge resistors for gate capacitance that charges during the positive drive period for the related portion of the circuit illustrated in the Figures. Zener diodes CR1 and CR2, along with Zener diodes CR5 and CR6, provide negative voltage clamping and positive voltage clamping that maintains the gate voltage of MOSFETs Q1 and Q2 within their rated magnitudes. A source of 170 volts DC is provided from point B+ to point B−.

By alternatively switching on and switching off, the portion of the circuit comprising MOSFETs Q1 and Q2 and MOSFETs Q3 and Q4 provide a sinusoidal current output signal 26 on line 28. Inductor L1 and capacitors C1, C2 and C3 provide filtering and isolation for the power amplifier. Capacitors C4 and C5 are utilized by the preferred embodiment of the present invention to provide additional filtering. These capacitors match the leakage reactance of the transformer and the load. The secondary winding of transformer T2 is shown connected to dashed box 30 which is used in the Figures to represent the components that comprise an output matching network. Transformer T2 is utilized to better match the intended load impedances that are present in electrical systems.

It should be understood that the primary function of the power amplifier illustrated in FIG. 1 is to convert a square wave modulated carrier signal 15 to a sinusoidal current signal 26 for injection onto a power line. However, it should also be understood that the magnitude of the output current signal 26 will vary as a function of the condition existing in relation to the power line. Various fault conditions can occur that are beyond the control of the power amplifier and these fault conditions can cause significant variations in the magnitude of the current output signal 26. If the magnitude of the current output signal 26 varies significantly, it can possibly achieve magnitudes that are destructive to the components of the power amplifier, such as the MOSFETs Q1, Q2, Q3 and Q4.

Figure 2:
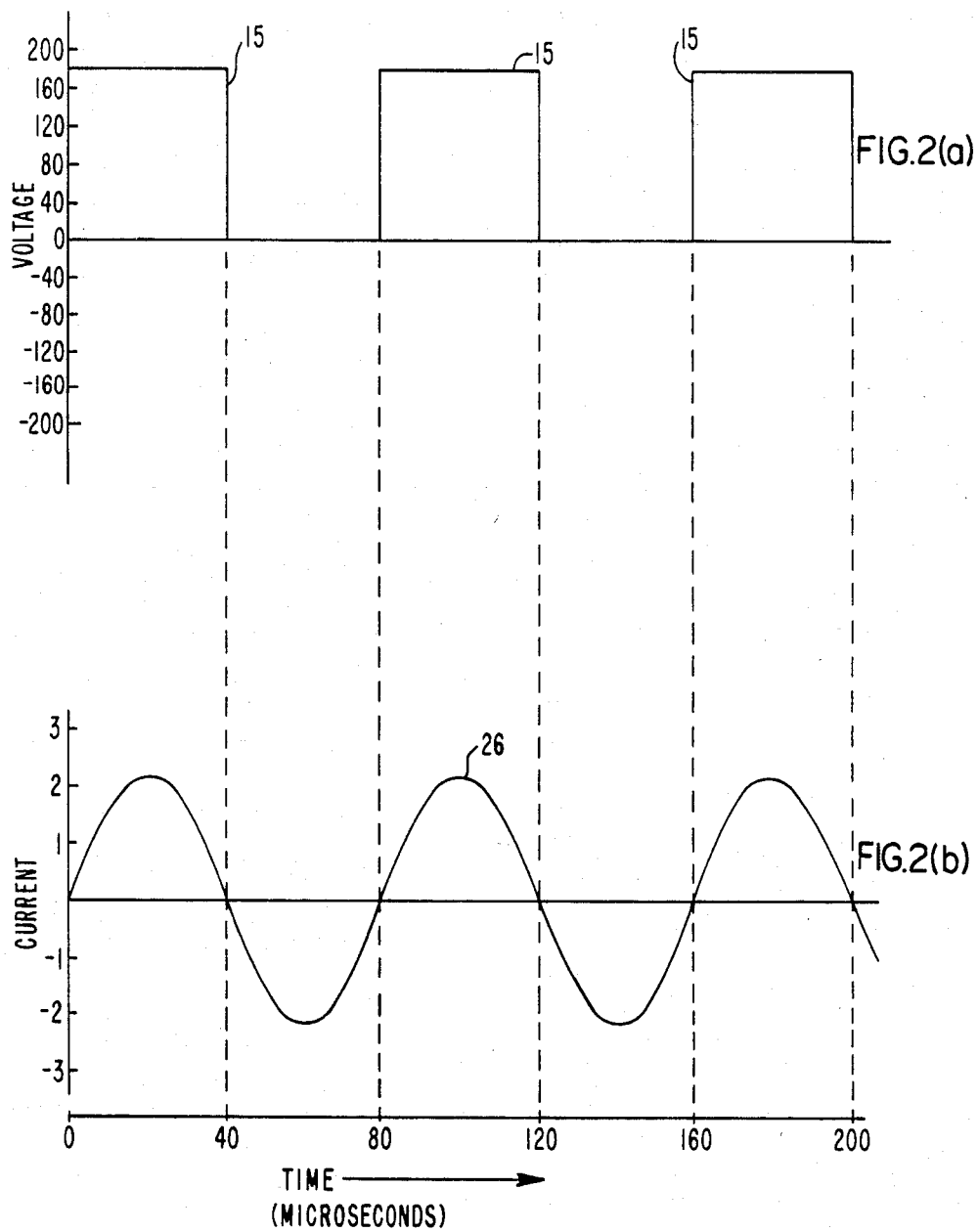
FIGS. 2(a) and 2(b) illustrate the unaltered voltage input and current output, respectively, of the power amplifier of FIG. 1.

During normal operation of the power amplifier of FIG. 1, the primary winding 18 of the transformer T1 receives square wave modulated carrier signals that have a magnitude of approximately 40 volts in a typical application. FIG. 2(a) illustrates the square wave modulated carrier signal 15 shown in FIG. 1. Provided that the impedances related to the power line itself are within acceptable limits, the output current signal 26 which is output on line 28 by the power amplifier appears as illustrated in FIG. 2(b). In a typical application, the current output signal 26 will have a peak magnitude of approximately two amps under normal conditions. However, as discussed above, variations in output impedance of the power line can cause severe fluctuations in the magnitude of the output current signal 26. Significant increases in this output current signal 26 can cause damage to the solid state components of the power amplifier illustrated in FIG. 1.

Figure 3:
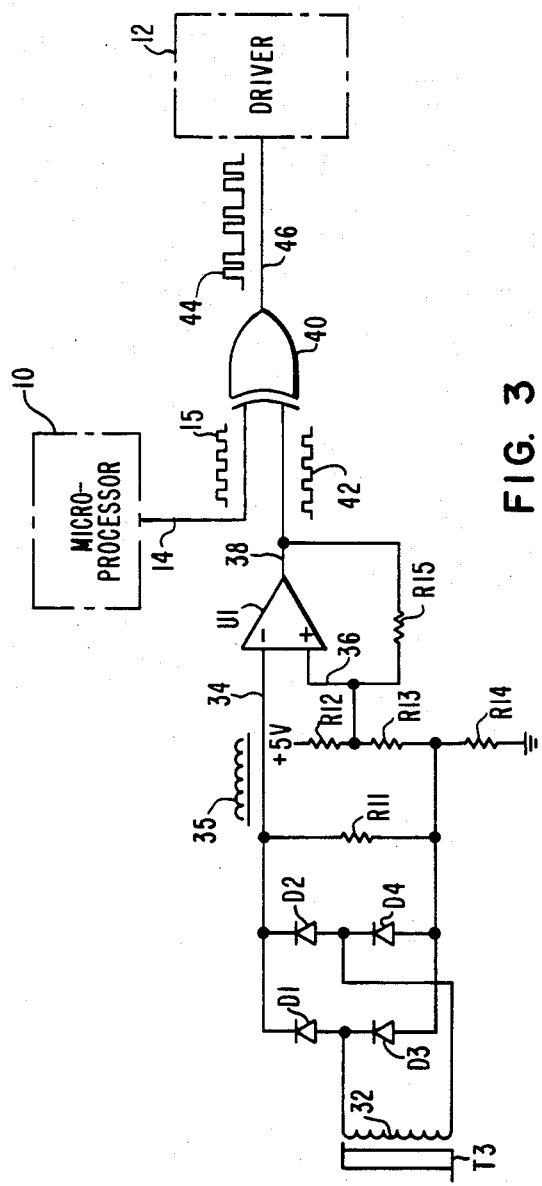
FIG. 3 is a schematic illustration of the present invention.

The present invention, which is illustrated in FIG. 3, provides current limiting that protects the components of the power amplifier under conditions when changes in the power line impedance cause the current output signal from the amplifier to increase beyond acceptable limits. As schematically illustrated in FIG. 3, the present invention incorporates a saturable core current transformer T3 which has a secondary winding 32. The primary winding of the current transformer T3 is a single turn primary which comprises line 28 in FIG. 1. Although alternative portions of the power line amplifier of FIG. 1 can be utilized as the primary winding for current transformer T3, a preferred embodiment of the present invention will be described in relation to an application in which line 28 of the power amplifier is used as the primary winding of current transformer T3.

The secondary winding 32 of the current transformer T3 is connected to a full wave rectifier circuit that comprises diodes D1, D2, D3 and D4 along with resistor R11. The function of these particular components is to rectify the current flowing through the secondary winding 32 of the current transformer T3 and provide a voltage signal representative of its magnitude. This voltage signal is connected to the inverting input of the comparator U1. The present invention also provides a resistive voltage divider comprising resistors R12, R13 and R14. As illustrated in FIG. 3, this resistive voltage divider is connected to a five volt DC source and a reference point of the voltage divider, between resistors R12 and R13, is connected to the non-inverting input of the comparator U1. Resistor R15 is included in the preferred embodiment of the present invention to provide positive feedback that guarantees that only one switch or notch is removed for each half cycle of the current output signal 26.

The primary function of the comparator U1 is to compare the rectified signal, received by its inverting input on line 34, with a reference voltage, received by its noninverting input on line 36, and provide an output signal on line 38 when the rectified signal exceeds the reference voltage signal.

From the above description of the present invention, it should be understood that the signal on line 38, which is output by the comparator U1, will be a square wave signal 42 which only achieves a non zero magnitude when the rectified signal 35, received on line 34, exceeds the reference signal received on line 36. Since the rectified signal 35 on line 34 represents the magnitude of the output current signal 26 that passes through the primary winding of the current transformer T3, the comparator U1 can be used to provide an output signal 42 on line 38 when the current output signal 26 exceeds a preselected threshold magnitude.

Line 38 is connected to one of the two inputs of an exclusive-OR gate 40. Although FIG. 3 is intended to illustrate only the particular components of the present invention, the microprocessor 10 and the driver 12 are illustrated, with dashed lines, for the purposes of demonstrating their relationship to the present invention.

The microprocessor 10 outputs a modulated carrier wave signal 15 on line 14. Line 14 and 38 are connected, as inputs, to the exclusive-OR gate 40. The output signal 42 on line 38 represents logical pulses that are created when the output current signal 26 exceeds the preselected threshold value. It should be understood that in normal operation, when no unexpected impedance changes occur on the power line, no signal would be present on line 38. Under these normal conditions, the modulated carrier signal 15 would pass, unaltered, through the exclusive-OR gate 40 to the driver 12. However, under conditions when the output current signal 26 exceeds its threshold, the output signal 42 of the comparator U1 would contain logically high pulses.

When the output signal 42 of the comparator U1 contains logically high pulses, these pulses alter the modulated carrier signal 15 to produce an altered signal 44 as an output of the exclusive-OR gate 40. Due to the operation of the exclusive-OR gate 40, which is well known to those skilled in the art, the presence of logically high pulses in the output signal 42 creates notches in the logically high pulses of the modulated carrier signal 15 or additional pulses in the logically low portions of the modulated carrier signal 15, depending on the instantaneous state of the modulated carrier signal 15 at the time a logically high pulse occurs in the output signal 42 from the comparator U1.

It should be understood that, although the altered signal 44 contains notches in its logically high portions and contains additional pulses in its logically low portions, its phase characteristics remain unchanged as it is sent to the driver 12 on line 46.

Figure 4:
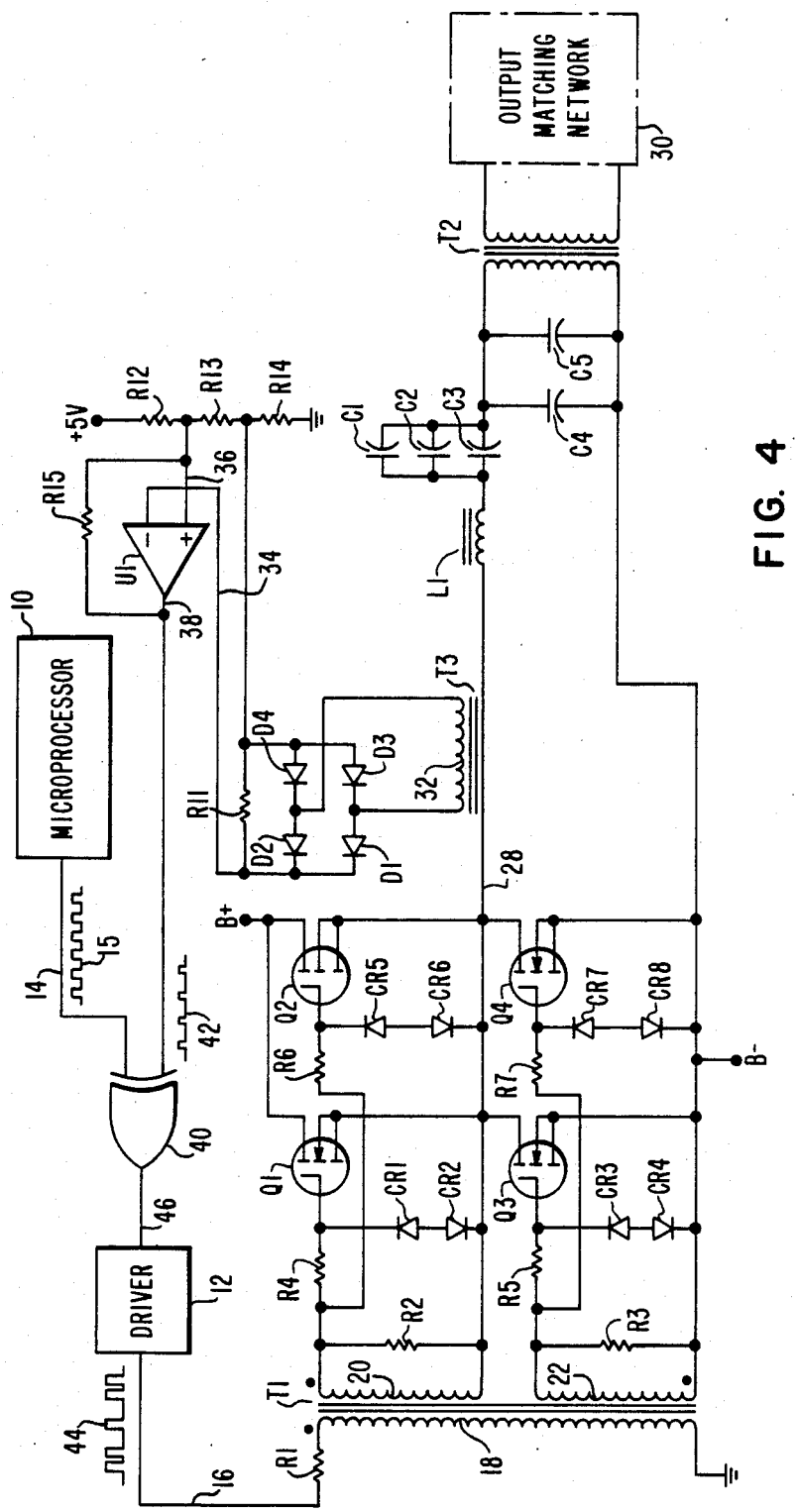
FIG. 4 illustrates a power amplifier incorporating the present invention.

FIG. 4 illustrates a power amplifier circuit comprising the present invention. By comparing FIGS. 1, 3 and 4, it can be seen that FIG. 4 is a combination of the present invention, which is illustrated in FIG. 3, associated with the power amplifier, which is illustrated in FIG. 1. In operation, the saturable core current transformer T3 of the present invention is cooperatively associated with line 28 of the power amplifier with line 28 being used as the primary winding of the current transformer T3. Therefore, the output current signals passing on line 28 can be sensed by the current transformer T3. As explained above, the secondary current of the current transformer T3 is rectified and a representative voltage signal is connected by line 34, to the inverting input of the comparator U1. Resistors R12, R13 and R14 provide a resistive voltage divider and their specific values are chosen so that a preselected threshold level can be provided, on line 36, to the noninverting input of the comparator U1. The output from the comparator U1 is connected, by line 38, to one input of the exclusive-OR gate 40 and the other input of the exclusive-OR gate 40 is connected, by line 14, to the microprocessor 10 which provides a modulated carrier signal. The output of the exclusive-OR gate 40 passes, on line 46, to a driver 12 which amplifies the signal and sends it, on line 16, to the primary winding of transformer T1.

When the altered square wave modulated carrier signal passes through the primary winding 18 and, subsequently, through the secondary windings 20 and 22, the notches and additional pulses of its square wave will have the effect of switching MOSFETs Q1 and Q2 and MOSFETs Q3 and Q4 on and off at different times than would occur if the modulated carrier signal was unaltered by the present invention. When a notch exists in the square wave of the modulated carrier signal, the effect is to switch between the MOSFETs at an earlier time than would normally occur. The effect of this additional switching is to limit the magnitude of the current signal that would normally have been achieved as a result of the 170 volt DC source being connected to line 28. Although the alteration of the square wave carrier signal, in the manner described above, has the effect of distorting the shape of the current signal output on line 28, it does not alter its fundamental frequency or phase characteristics. However, the magnitude of the current output signal on line 28 is reduced because of this distortion and the components of the paper amplifier, particularly the MOSFETs Q1, Q2, Q3 and Q4, are protected from damage.

In order to described the present invention in greater detail, the various signal waveforms related to its operation are illustrated in FIGS. 5(a), 5(b), 5(c) and 5(d). The waveforms in these figures represent the signals at various portions of the present invention. Looking at these figures in conjunction with FIG. 3, FIG. 5(a) illustrates the full wave rectified signal 35 that is sent to the inverting input of the comparator U1 on line 34. Since signal 35 is representative of the magnitude of the output current signal 26 of the power amplifier, it can be used in a comparison with a preselected threshold value. This threshold value is represented by $V_R$ in FIG. 5(a). The voltage reference $V_R$ is provided as an input to the noninverting input of comparator U1 on line 36 and is the result of the resistive voltage divider comprising resistors R12, R13 and R14.

FIG. 5(b) represents the signal output, on line 38, from the comparator U1. This signal 42 is logically high when the full wave rectified signal 35 exceeds its voltage reference $V_R$.

Referring now to FIGS. 4, 5(c) and 5(d), the functional relationship between the present invention and the power amplifier can more clearly be understood. FIG. 5(c) illustrates the square wave modulated carrier signal 15 which is output by the microprocessor 10 on line 14. Since signals 15 and 42 are used as inputs to the exclusive-OR gate 40, the output of the exclusive-OR gate 40 would be as illustrated by signal 44 of FIG. 5(d). Due to the operation of the exclusive-OR gate 40, the existence of a pulse of signal 42 causes a notch to appear in the carrier signal 15 and the result is the signal 44. Conversely, if a logically high pulse of signal 42 occurs when the carrier signal 15 is low, an additional pulse will appear in the altered signal 44. Of course, it should be understood that the pulses of signal 42 only occur when the output currents of the power amplifier (e.g. on line 28 of FIG. 4) exceeds a predetermined threshold level. Under normal operating conditions, the output current would remain below the threshold level and no pulses would occur as an output of comparator U1 and signal 42 would be a flat, logically low, signal.

In order to more fully describe the effect of the present invention when it is incorporated into a power amplifier, the relationship between the square wave modulated carrier signal, which is an input to the power amplifier, and the current output signal of the power amplifier will be described in greater detail and examples will be discussed for circumstances when the current output signal remains below the preselected threshold and when the current output signal exceeds the current threshold and the square wave carrier signal is altered by the present invention. Referring to FIGS. 4, 2(a) and 2(b), FIG. 2(a) illustrates the squave wave modulated carrier signal 15 which is sent to the primary winding 18 of the transformer T1, on line 16, from the driver 12. It should be understood that the signal on line 16 can be either an unaltered square wave or an altered square wave, depending on the magnitude of the current output signal on line 28, as described above. In the present discussion, it will be assumed, for illustrative purposes, that the signal on line 16 is an unaltered square wave signal which is identical to the signal output by the microprocessor 10 on line 14. This condition would exist when the output current signal 26 remains below the preselected threshold magnitude which is represented by the voltage level $V_R$. As the signal 15 passes through the primary winding 18 of the transformer T1, its dual secondaries, 20 and 22, respond alternatively to the logically high and logically low portions of the square wave signal 15. When the logically high portion of the square wave signal 15 causes a current to be induced in secondary winding 20, MOSFETs Q1 and Q2 are turned on and the B+ voltage of 170 volts DC is connected to line 28. If all conditions relating to the power line are normal and its impedances are within the accepted range, a current output signal will appear on line 28 that resembles the current output signal 26 illustrated in FIG. 2(b). In this particular illustration, a square wave maximum voltage of approximately 40 volts is output by the driver 12. This results in a square wave of approximately 160 volts being output from the MOSFET circuits to the inductor L1 and the resulting current output signal 26 achieves a maximum current of slightly more than two amps.

When the square wave signal 15 is logically low, MOSFETs Q1 and Q2 are switched off and MOSFETs Q3 and Q4 are switched on. This results in voltage B—, of approximately zero volts DC, being connected to line 28. This has the effect of providing a reverse current through line 28 which, as illustrated by FIGS. 2(a) and 2(b), is slightly greater than two amps. It can be seen that the alternating logic levels of the square wave modulated carrier signal have the effect, in conjunction with the operation of the power amplifier, of providing the alternating current levels of the output current signal 26 on line 28. However, it should be apparent that conditions on the power line can effect the magnitude of the current output signal 26 since the MOSFETs are voltage driven devices and a DC voltage of approximately 170 volts DC is provided. Severe changes in the impedance level of the power line sysem will cause significant changes in the magnitude of the output current signal 26. If the output current signal 26 is permitted to exceed the normal operating levels of the components in the power amplifier, severe damage could occur.

As described above, the present invention provides an apparatus which can notch the square wave signal when it senses that the current output signal 26 has exceeded a preselected threshold. The effect of that notching operation is illustrated in FIGS. 6(a) and 6(b). The notched square wave signal 44 is illustrated in FIG. 6(a). The square wave signal 44 has notches 56 within its normally logical high portions and an additional pulse 58 in its normally logical low portion. These alterations in the logical levels of the altered square wave 44 do not affect its fundamental frequency or phase characteristics. As the altered signal 44 passes through the primary winding 18 of the transformer T1, the secondary windings, 20 and 22, and their related MOSFETs respond to its logical high and low levels in a manner generally similar to that described above in relation to the unaltered square wave signal 15. When a logically high portion of the signal 44 passes through the primary winding 18, MOSFETs Q1 and Q2 are switched on and a positive DC voltage, from point B+, is connected to line 28 and a positive current passes through line 28. Conversely, when a logically low portion of the altered signal 44 passes through the primary winding 18, MOSFETs Q3 and Q4 are switched on and a negative current flows from the energy stored in the filter components.

If, under conditions of improper power line impedance, the square wave was unaltered, a current output signal such as the dashed line 58 in FIG. 6(b) would result. The increased magnitude of the current could cause severe damage to the components of the power amplifier. However, the notches 56 and additional pulses 58 alter the shape of the output current signal to that illustrated by signal 60 in FIG. 6(b). The actual effect of the present invention is to switch off MOSFETs Q1 and Q2 prematurely upon the occurrence of the notch 56. Instead of permitting the current signal to continue to rise, as indicated by dashed line 58 in FIG. 6(b), the MOSFETs are switched off and the alternate set of MOSFETs is switched on. This premature switching terminates the rise in the magnitude of the current output signal and reduces its maximum magnitude. It should be noted that the notch 56 in the altered square wave 44 of this example terminates prior to the end of its associated square wave pulse. The remaining portion of the square wave pulse prevents a rapid change in magnitude from positive to negative, or vice versa. As a result, the current signal 60 reduces to a zero magnitude at the time that the square wave pulse terminates. By notching the square wave signal 44, the present invention provides a means for limiting the output current signal while not affecting its fundamental frequency or phase characteristics. Although the altered current output signal 60 is distorted in shape and has a reduced maximum magnitude, its zero crossovers remain unchanged. For purposes of phase shift keyed (PSK) modulated carrier communication systems, the present invention therefore does not affect the power amplifier's ability to transmit the modulated signal. The energy storage in the filter elements, combined with the feedback resistor R15, achieve a hysteresis effect that limits the switching to one notch per half cycle. This limitation is important because it minimizes switch heating while reducing the output current.

Table I shows the value and types of the components of a preferred embodiment of the present invention. It should be understood that alternative embodiments of the present invention could be configured to use alternative values and types of components.

TABLE I

| Reference numeral | Type or value |
|---|---|
| R1 | 22Ω |
| R2 | 220Ω |
| R3 | 220Ω |
| R4 | 33Ω |
| R5 | 33Ω |
| R6 | 33Ω |
| R7 | 33Ω |
| R11 | 20Ω |
| R12 | 1.1KΩ |
| R13 | 560Ω |
| R14 | 1.1KΩ |
| T1 | 2:1:1 Ratio |
| T2 | 1:1–4:1 Adjustable Ratio |
| T3 | 100:1 Ratio |
| Q1 | IRF331 |
| Q2 | IRF331 |
| Q3 | IRF331 |
| Q4 | IRF33F |
| CR1 | IN4742 |
| CR2 | IN4744 |
| CR3 | IN4742 |
| CR4 | IN4744 |
| CR5 | IN4742 |
| CR6 | IN4744 |
| CR7 | IN4742 |
| CR8 | IN4744 |
| C1 | 0.1 μf |
| C2 | 0.1 μf |
| C3 | 0.1 μf |
| C4 | 1 MFD |
| C5 | 1 MFD |
| D1 | 1N4186 |
| D2 | 1N4186 |
| D3 | 1N4186 |
| D4 | 1N4186 |
| U1 | LM211 |
| L1 | 540 μh |

The present invention provides an apparatus which effectively limits the magnitude of a output current signal without affecting its or phase characteristics. Therefore, it is applicable in association with phase modulated power line communication systems as a current limiter which is both simple and efficient. Although the present invention has been described in considerable detail and illustrated with specificity, it should not be considered to be so limited. Alternative embodiments of the present invention which use its concepts but with alternative components should be considered to be within its scope.

What I claim is:

1. An apparatus for limiting an output current of a power amplifier which has a modified phase modulated signal at its input, comprising:
   first means for providing a first signal, said first signal being representation of said output current;
   second means for providing a second signal, said second signal being representative of a reference magnitude;
   means for comparing said first signal and said second signal, said comparing means being configured to provide a third signal, said third signal being indicative of a first occurrence when said first signal exceeds said second signal; and
   means for altering a phase modulated signal as a function of said third signal, said altering means providing said modified phase modulated signal at an output which is connected as an input to said power amplifier, said altering means comprising an exclusive-OR gate having as its inputs said phase modulated signal and said third signal.

2. The apparatus of claim 1, wherein:
   said first signal providing means comprises a current transformer.

3. The apparatus of claim 1, wherein:
   said second signal providing means comprises a resistive voltage divider.

4. The apparatus of claim 1, wherein:
   said comparing means comprises a comparator having an inverting input electrically connected with said first signal providing means and a noninverting input electrically connected with said second signal providing means.

5. The apparatus of claim 1, wherein:
   said first signal providing means comprises a current transformer;
   said second signal providing means comprises a resistive voltage divider;
   said comparing means has an inverting input electrically connected with said first signal providing means and a noninverting input electrically connected with said second signal providing means; and
   said altering means comprises an exclusive-OR gate having as its inputs said phase modulated signal and said third signal.

6. The apparatus of claim 5, further comprising:
   a full wave rectifier electrically connected between a secondary winding of said current transformer and said inverting input of said comparing means.

7. A power amplifier, comprising:
   means for switching from a positive voltage to a negative voltage in response to a modified phase modulated signal magnitude, said switching means being configured to alternate its output waveform magnitude between positive and negative levels to form a sinusoidal current signal;
   first means, connected to an output of said power amplifier, for providing a first signal representative of said sinusoidal current signal, said first means comprising a current transformer;
   means for rectifying said first signal;
   second means for providing a reference signal representative of a preselected current magnitude;
   means for comparing said first signal and said reference signal, said comparing means being configured to provide a second signal having logic levels which represents a result of a comparison of the magnitudes of said first signal and said reference signal; and
   means for changing a phase modulated signal based on a preselected logical level of said second signal and outputting said modified phase modulated signal.

8. The amplifier of claim 7, wherein:
   said second reference signal providing means comprises a voltage divider.

9. The amplifier of claim 7, wherein:
   said comparing means comprises a comparator having an inverting input electrically connected with said first signal providing means and a noninverting input electrically connected with said second providing means.

10. The amplifier of claim 7, wherein:
    said changing means is an exclusive-OR gate having said phase modulated signal and said second signal as its inputs.

11. A current limiter for a switching power amplifier that has a phase modulated input and a current signal output, comprising:
    a current transformer electrically connected with the current signal output of said amplifier;
    a full wave rectifier electrically connected with a secondary winding of said current transformer, said rectifier producing a first signal representative of said current signal output;
    a resistive voltage divider producing a preselected reference signal;
    a comparator having its inverting input electrically connected to said first signal and its noninverting input electrically connected to said reference signal, said comparator providing an output representative of relative magnitudes of said first signal and said reference signal; and
    an exclusive-OR gate having at its inputs said phase modulated input and said output of said comparator, said exclusive-OR gate having its output electrically connected with the phase modulated input of said power amplifier.

* * * * *